United States Patent
Hsieh

(10) Patent No.: US 6,695,268 B1
(45) Date of Patent: Feb. 24, 2004

(54) ADUSTABLE FOOTPRINT TRIPOD

(76) Inventor: Wu-Hong Hsieh, No. 162, Chung Shan 2nd Rd., Lu Chou City, Taipei Hsien (TW)

( * ) Notice: Subject to any disclaimer, the term of this patent is extended or adjusted under 35 U.S.C. 154(b) by 0 days.

(21) Appl. No.: 10/351,396

(22) Filed: Jan. 27, 2003

(51) Int. Cl.[7] ............................................. A47B 91/00
(52) U.S. Cl. .................................................. 248/188.7
(58) Field of Search ................................ 248/460, 462, 248/463, 464, 465, 188.7, 436, 166, 188.6

(56) References Cited

U.S. PATENT DOCUMENTS

| | | | | |
|---|---|---|---|---|
| 1,837,637 A | * | 12/1931 | Walberg | 84/421 |
| 2,464,031 A | * | 3/1949 | Fiedel | 248/167 |
| 3,173,642 A | * | 3/1965 | Greenspan | 248/170 |
| 3,847,335 A | * | 11/1974 | Ross | 248/166 |
| 4,433,870 A | * | 2/1984 | Bairen et al. | 297/16.1 |
| 4,744,536 A | * | 5/1988 | Bancalari | 248/125.8 |
| 4,819,902 A | * | 4/1989 | Wenger et al. | 248/460 |
| 5,121,890 A | * | 6/1992 | Komada | 248/122.1 |
| 5,318,258 A | * | 6/1994 | Lang | 248/166 |
| 6,254,044 B1 | * | 7/2001 | Lee | 248/177.1 |

* cited by examiner

*Primary Examiner*—Ramon O. Ramirez
*Assistant Examiner*—Kofi Schulterbrandt
(74) *Attorney, Agent, or Firm*—Rosenberg, Klein & Lee

(57) ABSTRACT

A tripod includes a body, three legs, a connecting bracket and a post. The body has a top surface, and the connecting bracket is attached to the top surface of the body. The post has a top end and a bottom end, and the bottom end of the post is pivotally attached to the connecting bracket. The three legs are attached horizontally to the body. Two of the legs are pivotally attached to the body such that the legs can be pivoted away from each other within an angular displacement. Consequently, the tripod will stand firmly on the ground to support an object such as a sheet music holder.

6 Claims, 10 Drawing Sheets

US 6,695,268 B1

ADJUSTABLE FOOTPRINT TRIPOD

BACKGROUND OF THE INVENTION

1. Field of the Invention

The present invention relates to a tripod, and more particularly to a tripod suitable for supporting a music stand, microphone or the like.

2. Description of Related Art

Music stands are used to hold sheet music for musicians or singers when they are performing. With reference to FIG. 10, a conventional tripod for a music stand includes a post (80), a connector (81) and three legs (82). The post (80) has a top end (not numbered) and a bottom end (not numbered). The top end of the post (80) is adapted to connect to a sheet music holder (83), and the bottom end of the post (80) is attached to the connector (81). The connector (81) has a top (not numbered) and a bottom (not numbered). The bottom end of the post (80) is attached to the top of the connector (81). The legs (82) are equally spaced around and pivotally attached to the bottom of the connector (81) such that the music stand can stand on the ground.

However, the center of gravity of the conventional tripod is high. The conventional tripod with the higher center of gravity is easily overturned when inadvertently bumped. Furthermore, a music stand with a conventional tripod can only be adjusted in height. The music stand with a conventional tripod cannot fulfill the requirements of all musicians because some may stand, sit or move when they are performing.

To overcome the shortcomings, the present invention provides a tripod to mitigate or obviate the aforementioned problems.

SUMMARY OF THE INVENTION

The main objective of the invention is to provide a tripod for supporting an object such as a sheet music holder, microphone or the like that can firmly stand on the ground.

Another objective of the invention is to provide a multi-purpose tripod that can not only support an object but also hold and display musical instruments.

Other objectives, advantages and novel features of the invention will become more apparent from the following detailed description when taken in conjunction with the accompanying drawings.

DETAILED DESCRIPTION OF PREFERRED EMBODIMENT

Figure 1:
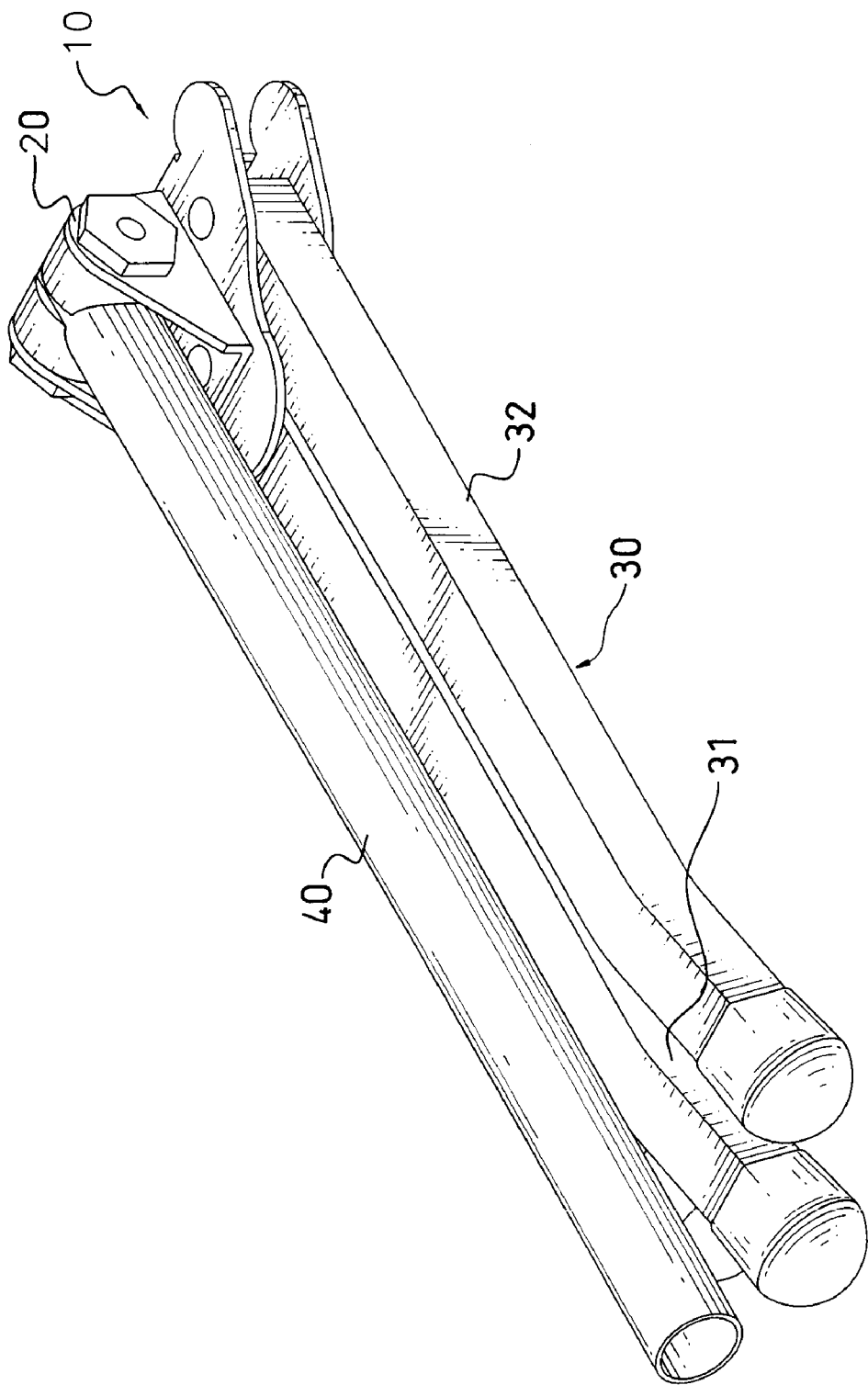
FIG. 1 is a perspective view of a tripod in accordance with the present invention that is folded.
Figure 2:
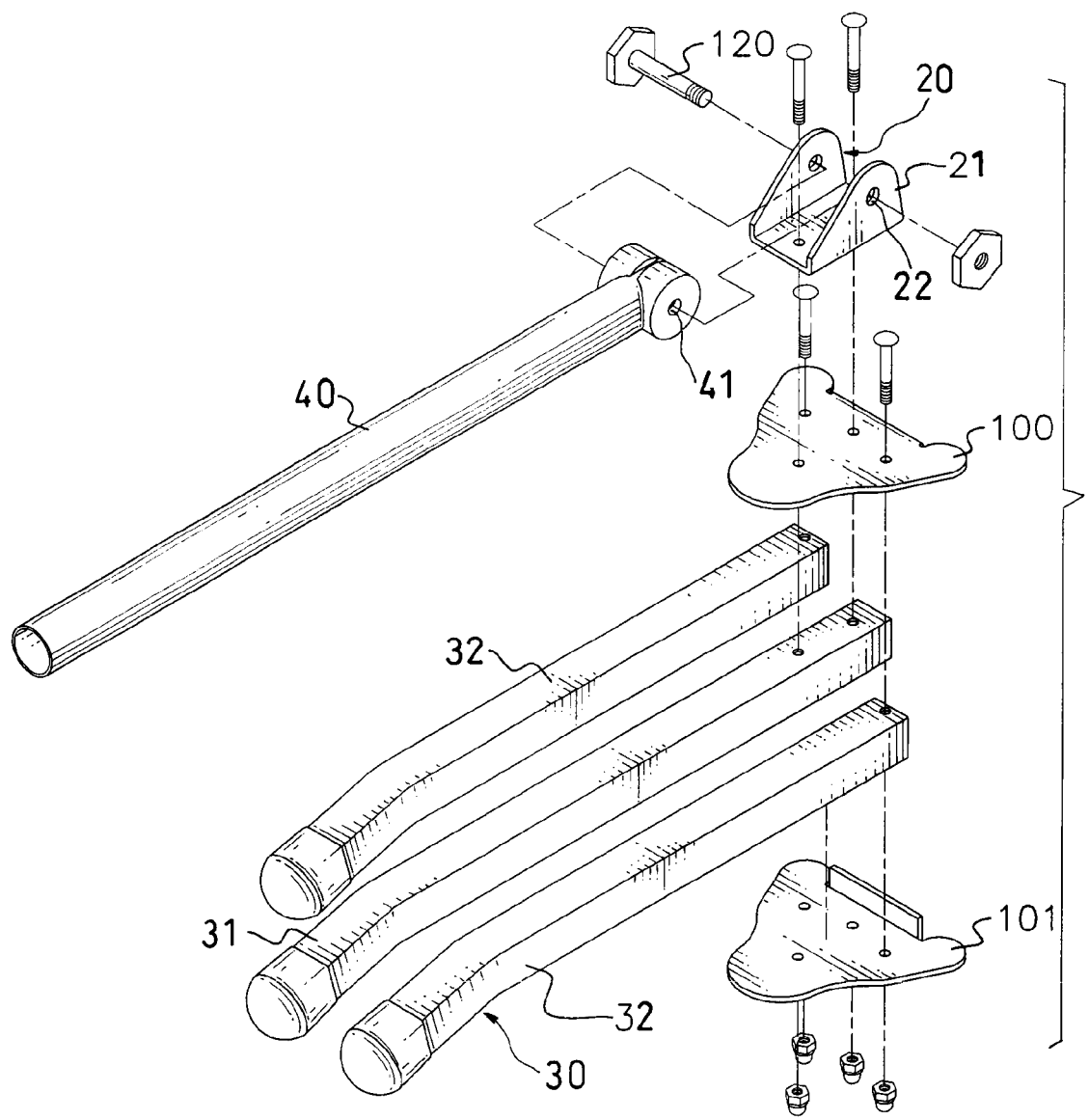
FIG. 2 is an exploded perspective view of the tripod in FIG. 1.
Figure 3:
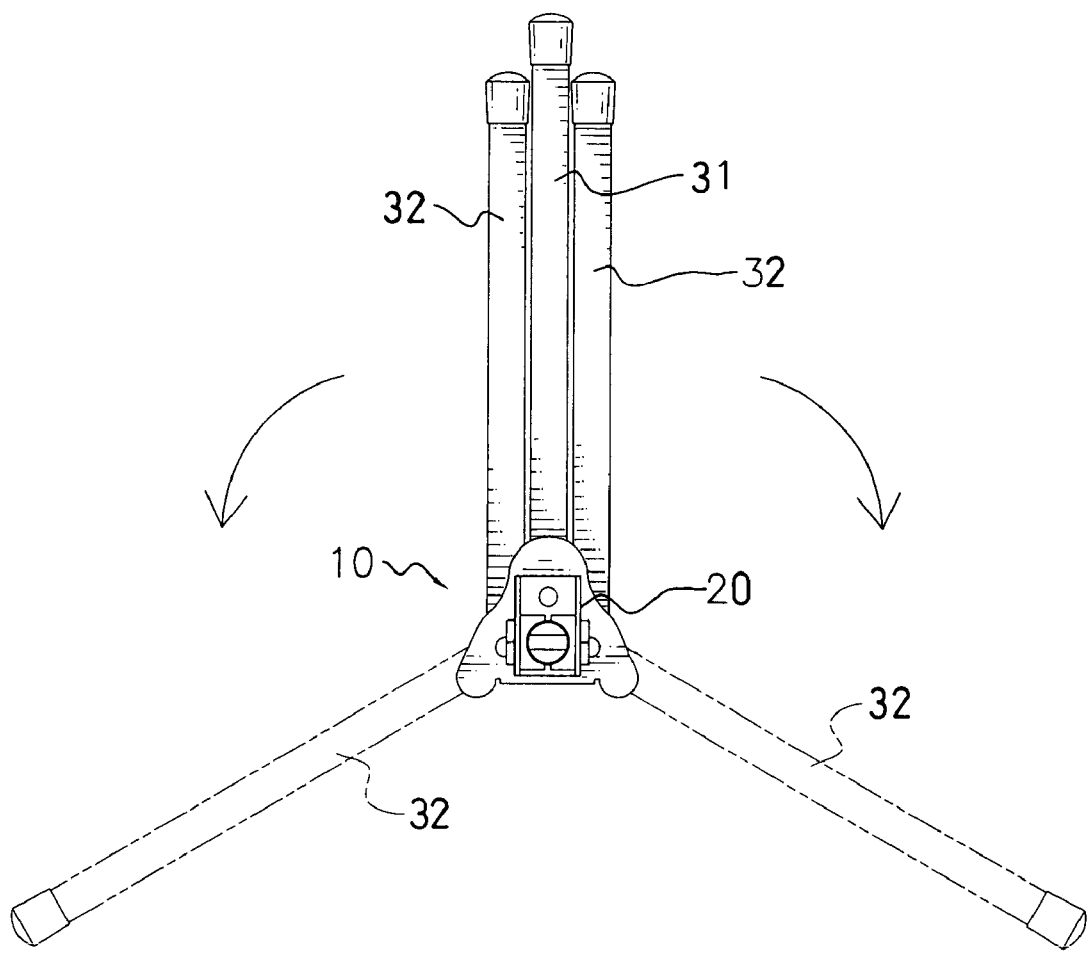
FIG. 3 is an operational top plan view of the tripod in FIG. 1.

With reference to FIGS. 1 to 4, a first preferred embodiment of a tripod in accordance with the present invention comprises a body (10), a connecting bracket (20), legs (30) and a post (40). The body (10) comprises an upper member (100) and a lower member (101) mounted underneath the upper member (100). The upper member (100) has a top (not numbered) to which the connecting bracket (20) is attached.

The connecting bracket (20) connects the post (40) to the body (10). The connecting bracket (20) has two opposite wings (21) with a top edge (not numbered) formed parallel to each other and perpendicular to the top of the upper member (100). A pivot hole (22) is transversally defined in each opposite wing (21) near the top edge, and the pivot holes (22) are aligned.

The legs (30) are horizontally mounted in the body (10) between the upper and the lower members (100, 101) with fasteners such as nuts and bolts. The legs (30) comprise a stationary central leg (31) and two adjustable side legs (32). The stationary central leg (31) has a proximal end (not numbered), a distal end (not numbered) and two opposite sides (not numbered). The proximal end of the stationary central leg (31) is attached securely between the upper and the lower members (100, 101) of the body (10) with fasteners such as nuts and bolts through the connecting bracket (20), the upper member (100), the stationary central leg (31) and the lower member (101). The connecting bracket (20) is mounted on the top of the upper member (100), and the wings (21) are aligned with the stationary central leg (31). Similarly, each adjustable side leg (32) has a proximal end (not numbered), a distal end (not numbered) and a top (not numbered). The proximal ends of the adjustable side legs (32) are pivotally attached between the upper and the lower members (100, 101) of the body (10) at proper pivoting points with fasteners such as nuts and bolts on opposite sides of the stationary central leg (31). The adjustable side legs (32) can be pivoted away from the stationary central leg (31) up to an angle of 120° relative to the stationary central leg (31). In such a situation, the tripod is balanced for supporting a music stand or the like.

The post (40) has a top end (not numbered) and a bottom end (not numbered). A pivot hole (41) is transversally defined in the post (40) near the bottom end. The pivot hole (41) is aligned between the pivot holes (22) in the wings (21). A pivot pin (120) with an enlarged end (not numbered) and a threaded end (not numbered) passes through the pivot hole (41) in the post (40) and the aligned pivot holes (22) in the wings (21). A nut (not numbered) is screwed on the threaded end of the pivot pin (120), which extends out of the hole (22) in one of the wings (21). The top end of the post (40) is adapted to retractably connect to a telescoping rod (50) used to support a sheet music holder (51).

Figure 5:
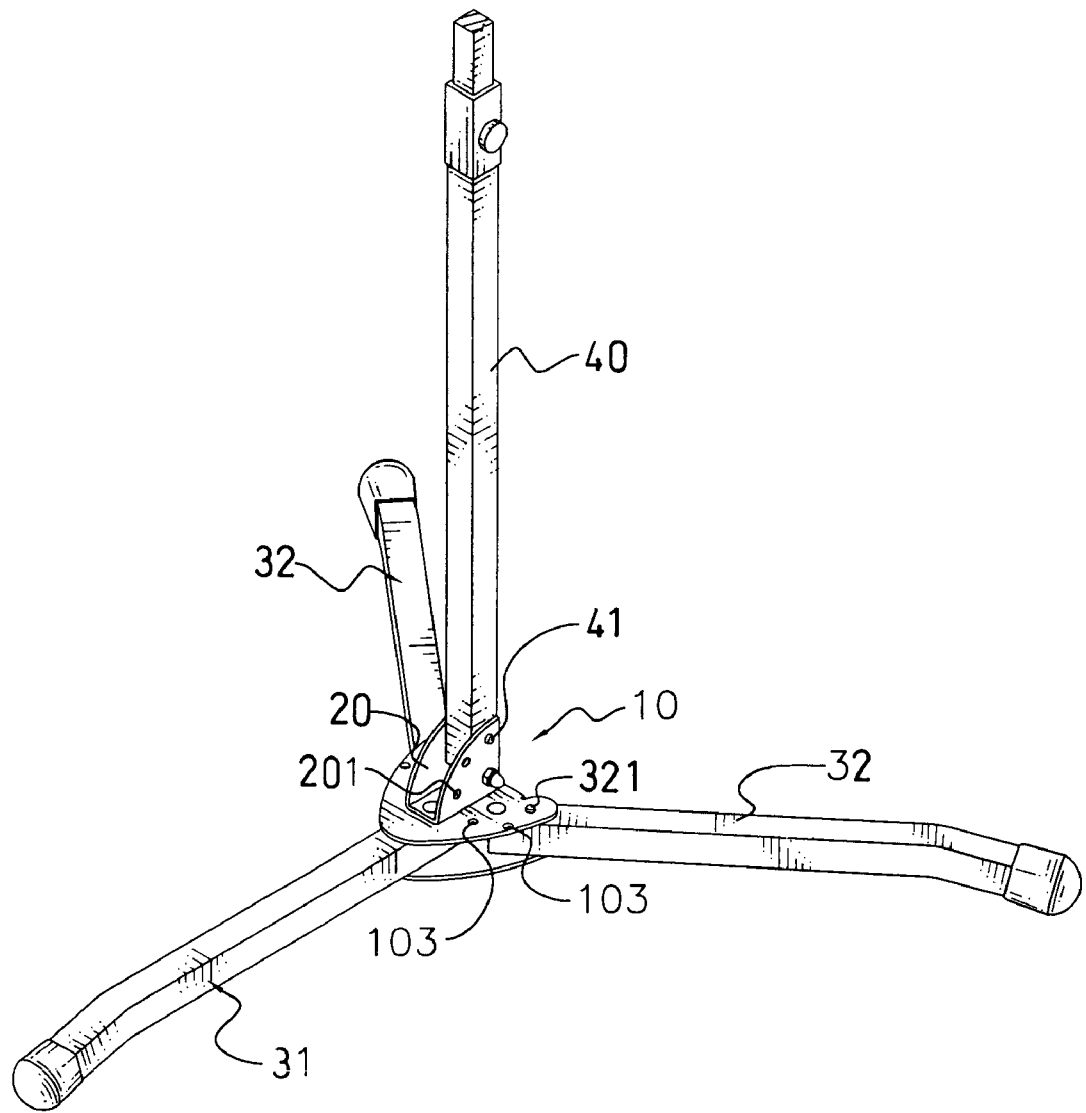
FIG. 5 is a perspective view of a second embodiment of the tripod in accordance with the present invention.

With reference to FIG. 5, a second embodiment of the tripod in accordance with the present invention has multiple positioning holes (201, 103) to exactly position the adjustable side legs (32) with respect to the stationary central leg (31) and the post (40) with respect to the connecting bracket (20).

To exactly position the post (40) with respect to the connecting bracket (20), multiple positioning holes (201)

.are defined through one of the wings (21) of the connecting bracket (20). The positioning holes (201) in the wing (21) are arranged radially around a pivot hole (not shown) in the wing (21). A locking stub (41) is retractably mounted in the post (40) corresponding to the positioning holes (201) in the wing (21) and adapted to selectively engage one of the positioning holes (201) in the wing (21). Consequently, the post (40) pivots around the pivot hole (41) in the bottom end of the post (40) and the aligned pivot holes (22) in the wings (21) of the connecting bracket (20). The post (40) can be tilted to specific angles relative to the ground to accommodate a musician or singer's requirements.

The positioning holes (103) in the upper member (100) are formed radially around the pivot points of the proximal ends of the adjustable side legs (32). A locking stub (321) is retractably mounted in each adjustable side leg (32) corresponding to the positioning holes (1 03) in the upper member (100) and adapted to selectively engage one of the positioning holes (103) in the upper member (100). Therefor, a user can adjust the adjustable side legs (32) away from the stationary central leg (31) to specific angles relative to the stationary central leg (31) by means of the engagement of the positioning holes (103) and the locking stub (321).

Figure 4:
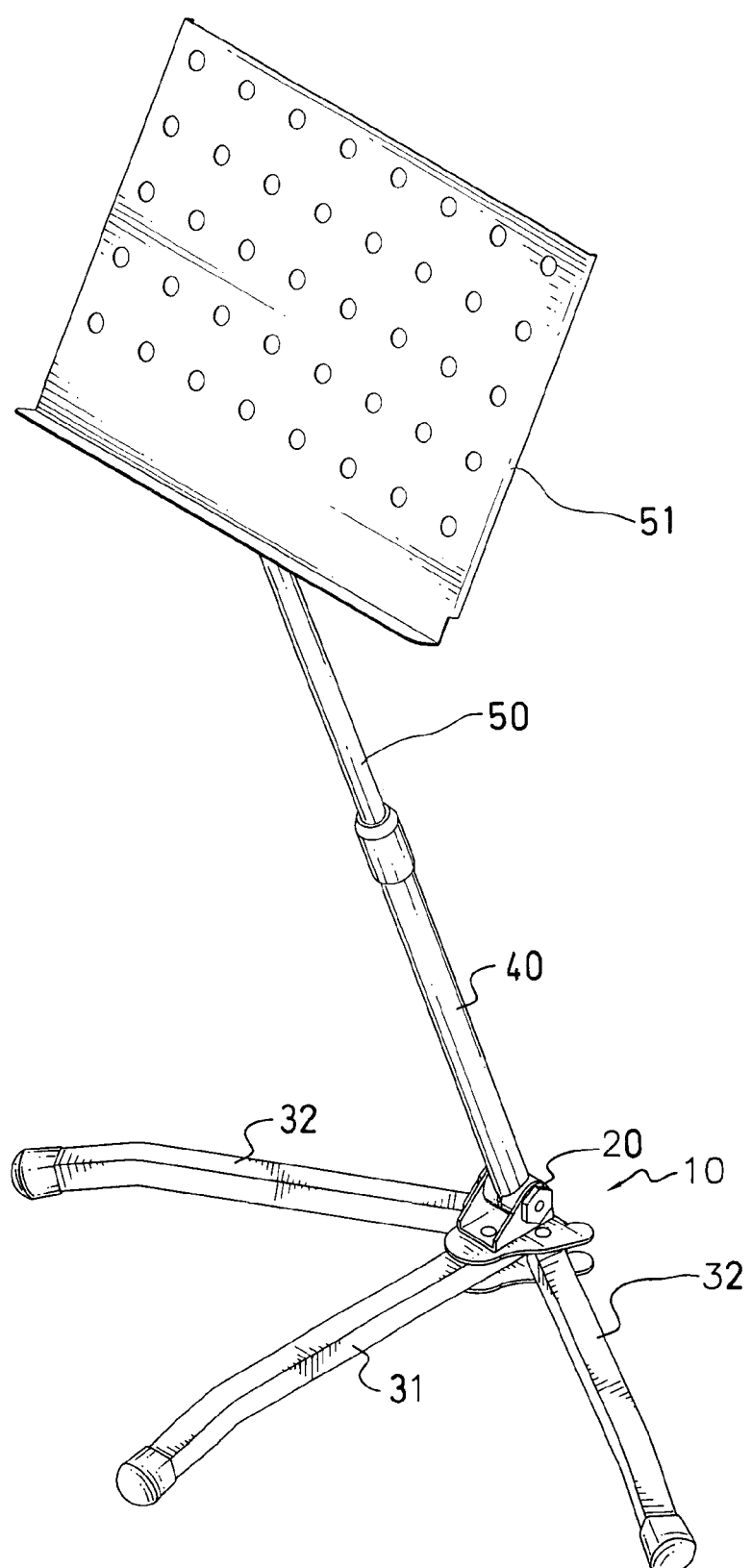
FIG. 4 is an operational perspective view of the tripod in FIG. 1 used to support a sheet music holder.
Figure 6:
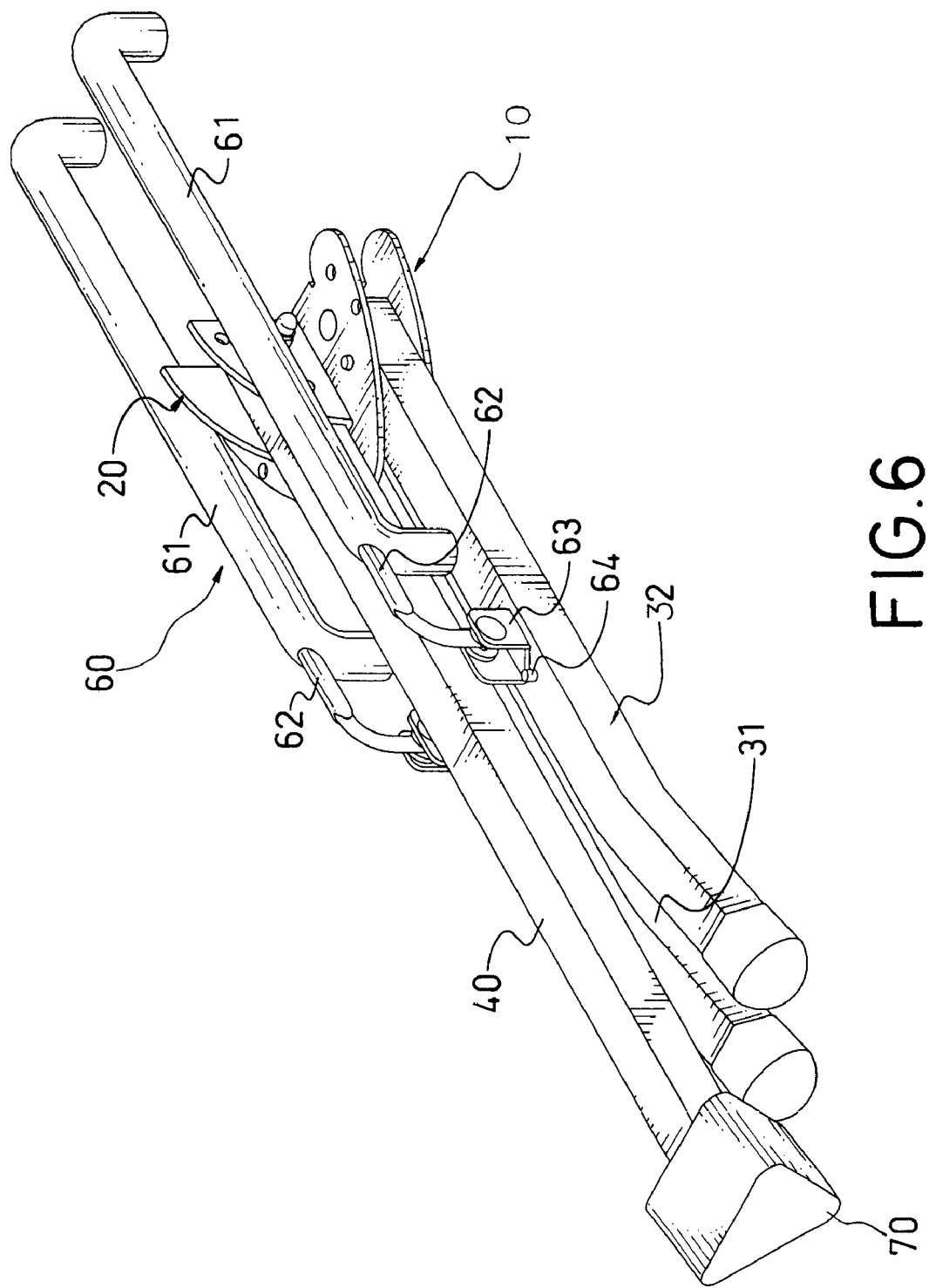
FIG. 6 is a perspective view of a third embodiment of the tripod in accordance with the present invention.
Figure 7:
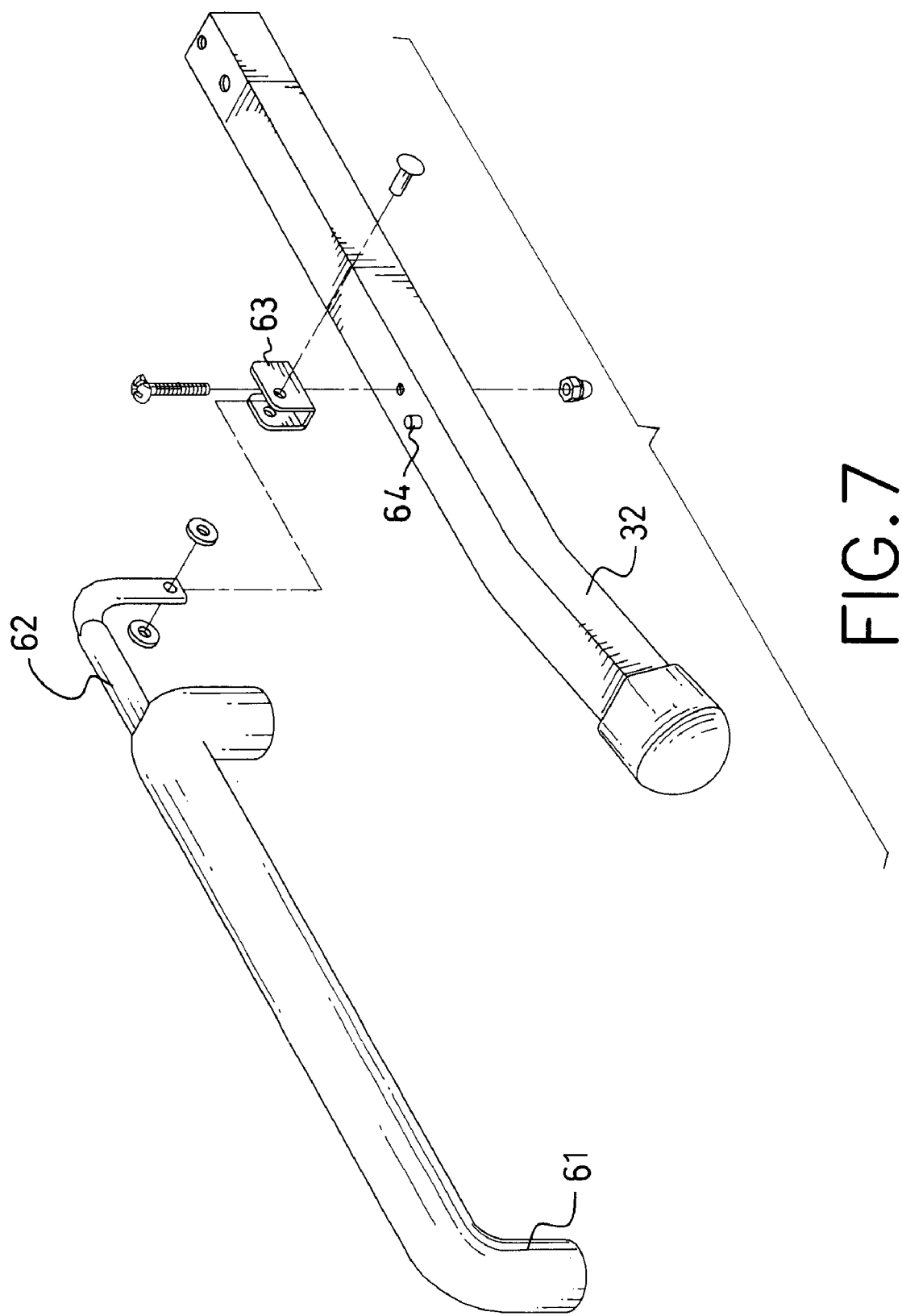
FIG. 7 is an enlarged, exploded perspective view of a tripod instrument support arm assembly and adjustable side leg in FIG. 6.

With reference to FIGS. 6 and 7, a third embodiment of the tripod includes additional features that can be implemented with either of the first or second embodiment of the tripod so the tripod can function as a musical instrument stand. Two instrument support arm assemblies (60) are mounted on the top of the adjustable side legs (32) respectively, and a bumper (70) is mounted in the top end of the post (40) rather than the telescoping rod (50) as shown in FIG. 4.

Each arm assembly (60) includes a U-shaped rod (61), a connecting rod (62), a bracket (63) and a stop (64). The bracket (63) has an angled edge (not numbered) facing the distal end of the adjustable side leg (32), a short side (not numbered) and a long side (not numbered) and is pivotally mounted on the top of the adjustable side leg (32) with a fastener such as a nut and bolt. The connecting rod (62) is L-shaped and has a proximal end (not numbered) and a distal end (not numbered). The proximal end of the connecting rod (62) is pivotally attached to the bracket (63), and the distal end is attached to the U-shaped rod (61). The U-shaped rod (61) has two ends (not numbered) facing the adjustable side leg (32) and is attached to the distal end of the connecting rod (62). The stop (64) is mounted on the top of the adjustable side leg (32) to abut the angled edge of the bracket (63) when the arm assemblies (60) are aligned with the adjustable side legs (32).

Figure 8:
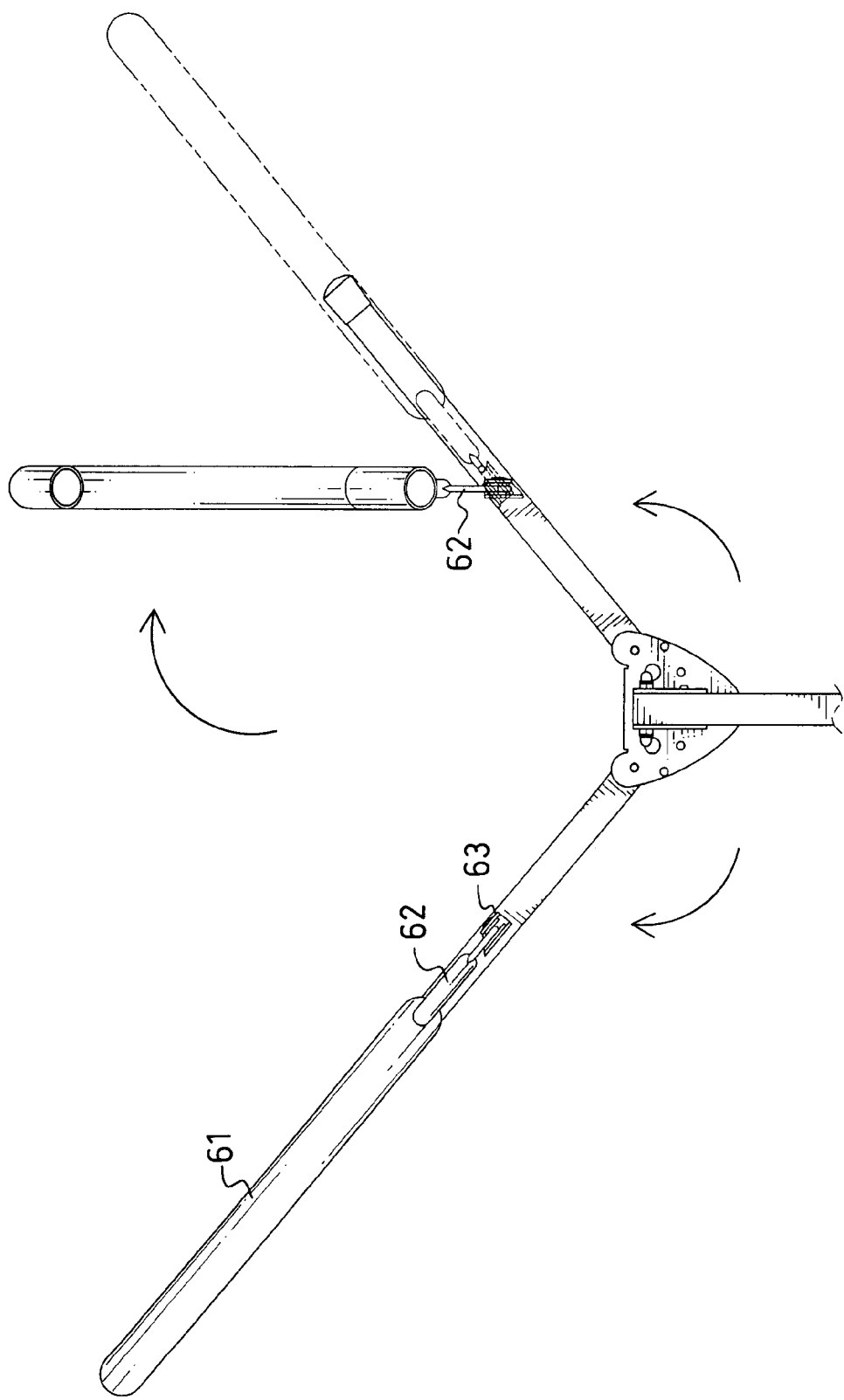
FIG. 8 is an operational top plan view of the tripod in FIG. 6.
Figure 9:
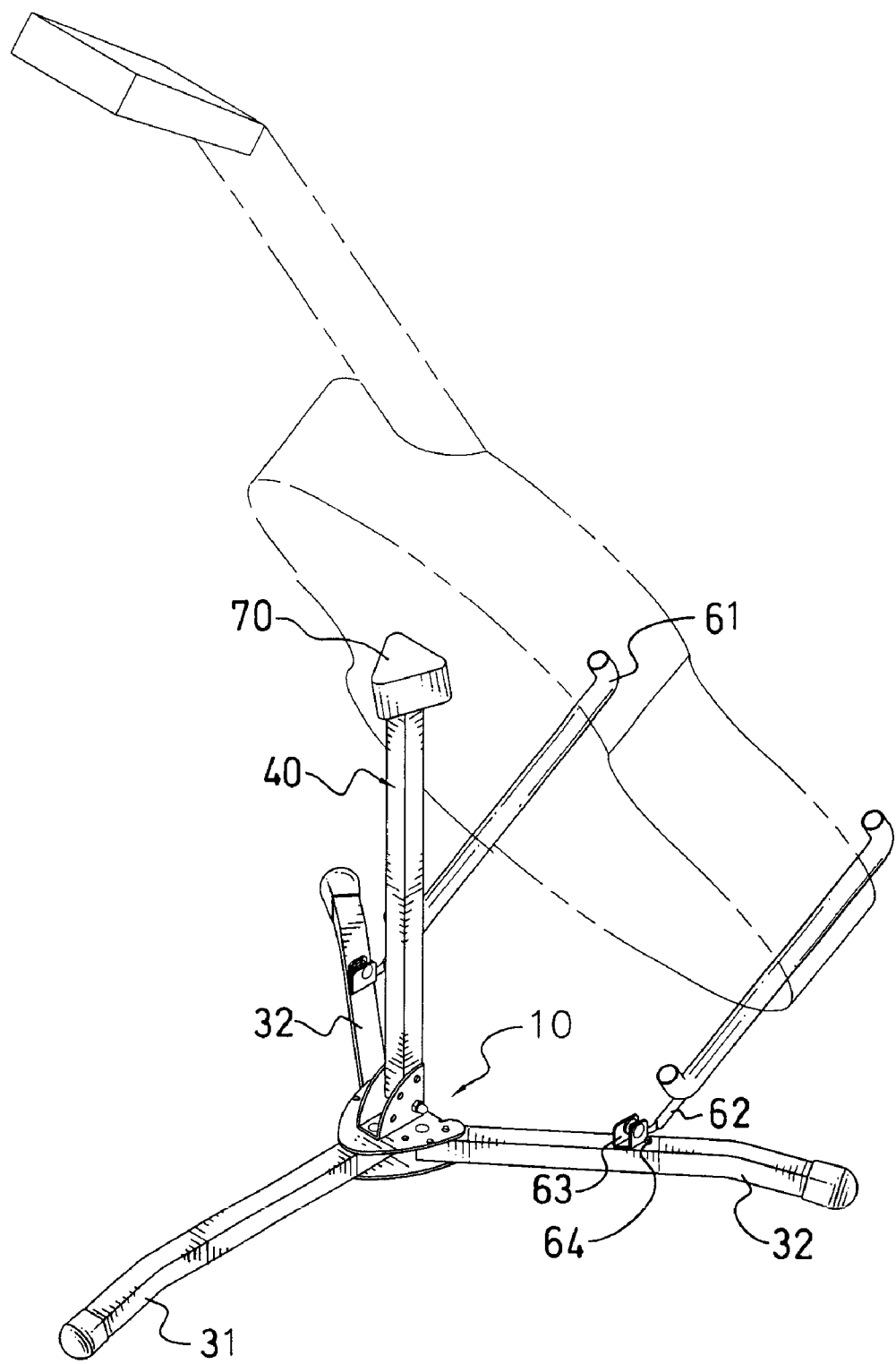
FIG. 9 is an operational perspective view of the tripod in FIG. 6.
Figure 10:
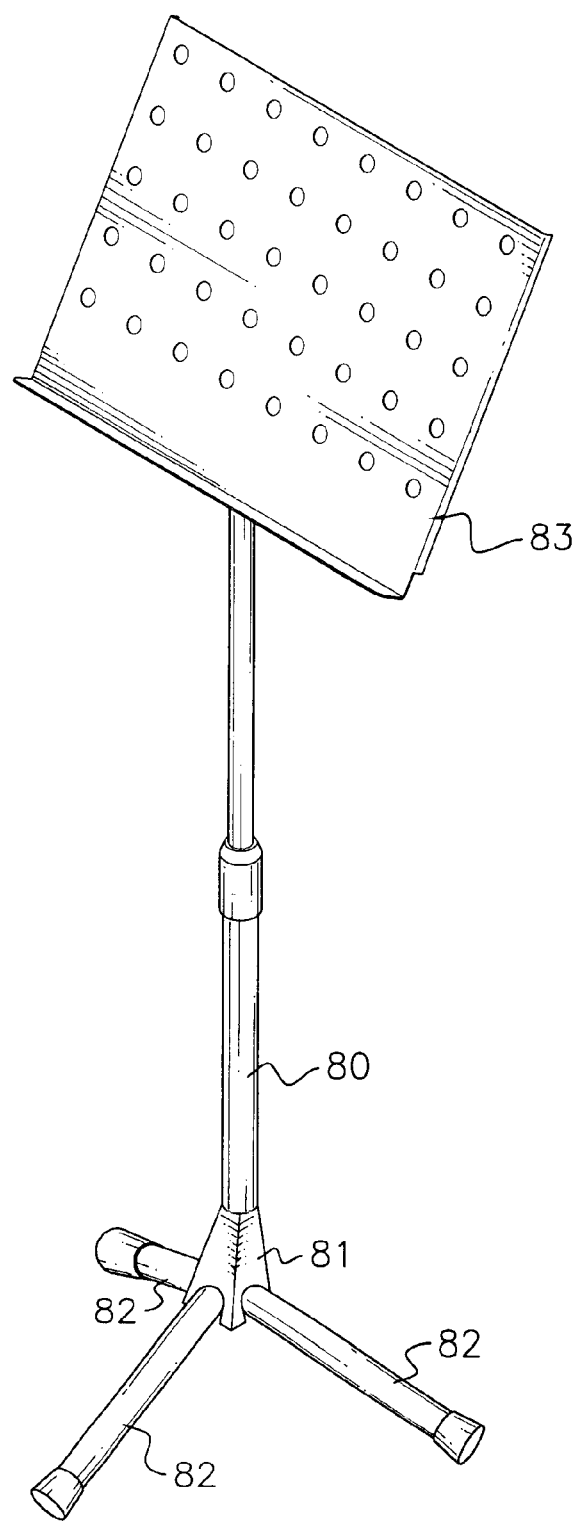
FIG. 10 is a perspective view of a music stand with a conventional tripod.

With reference to FIGS. 8 and 9, the arm assemblies (60) are positioned for use by first pivoting the adjustable side legs (32) away from the stationary central leg (31). Then U-shaped rods (61) are pivoted relative to the bracket (63) such that the ends of the U-shaped rods (61) face up. Then the bracket (63) is pivoted relative to the adjustable side leg (32) so the short side of the bracket (63) abuts the stop (64). With the short side of the bracket (63) abutting the stop (64), the U-shaped rods (61) are parallel and extend away from the post (40). A musical instrument can be placed on the U-shaped rods (61) between the two ends and leaned against the bumper (70) on the post (40) to display or temporarily hold a musical instrument such as a guitar.

Because the center of the gravity of the tripod is close to the ground, the tripod stands firmly on the ground. Otherwise, the tripod is multi-purpose and can not only support a sheet music holder but can display or hold a musical instrument. Furthermore, the post (40) of the tripod can be tilted to an angle relative to the ground such that the sheet music holder or the like supported by the post (40) can be adjusted to a suitable, preferred angle for the user.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A tripod comprising:

a body with a top;

a connecting bracket with two wings formed parallel to each other attached to the top of the body, and a pivot hole transversally defined in each wing;

a post pivotally mounted in the connecting bracket by means of a pivot pin and the post having
  a top end,
  a bottom end, and
  a pivot hole transversally defined in the post near the bottom end aligned with between the pivot holes in the two wings of the connecting bracket; and three legs horizontally mounted in and extending from the body;

wherein at least two of the legs are pivotally mounted in the body and have a capability of pivoting away from each other within a specific angular displacement, and the bottom end of the post is squeezed between the two wines of the connecting bracket to hold the post in place;

wherein the body comprises
  an upper member with the top; and
  a lower member disposed underneath the upper member, the wings of the connecting bracket are formed perpendicular to the top of the upper member;

the legs comprising
  a stationary central leg having a proximal end, a distal end and two opposite sides, and the proximal end of the stationary central leg secured between the upper and the lower members of the body; and
  two adjustable side legs, each having a proximal end, a distal end and a top, and the proximal end of each adjustable side leg respectively and pivotally mounted at a pivoting point disposed each opposite side of the stationary central leg between the upper and the lower members of the body; and the pivot pin has an enlarged end and a threaded end passes through the pivot hole in the post and the aligned pivot holes in the wings, and a nut is screwed on the threaded end of the pivot pin, which extends out of the pivot hole in one of the wings to exactly position the post in the connecting bracket;

wherein multiple positioning holes are transversally defined through one of the wings of the connecting bracket and are radially arranged around the pivot hole in the wing;

a locking stub is retractably mounted in the post corresponding to the positioning holes in the wing and is adapted to selectively engage one of the positioning holes in the wing;

multiple positioning holes are defined through the top of the upper member of the body and are radially arranged around each pivoting point of the proximal end of each adjustable side leg; and a locking stub is retractably mounted in each adjustable side leg corresponding to the positioning holes in the upper member and is adapted to selectively engage one of the positioning holes in the upper member.

2. A tripod comprising:

a body with a top;

a connecting bracket with two wings formed parallel to each other attached to the top of the body, and a pivot hole transversally defined in each wing;

a post pivotally mounted in the connecting bracket by means of a pivot pin and the post having
   a top end,
   a bottom end, and
   a pivot hole transversally defined in the post near the bottom end aligned with between the pivot holes in the two wings of the connecting bracket; and three legs horizontally mounted in and extending from the body;

wherein at least two of the legs are pivotally mounted in the body and have a capability of pivoting away from each other within a specific angular displacement, and the bottom end of the post is squeezed between the two wings of the connecting bracket to hold the post in place;

wherein the body comprises
   an upper member with the top; and
   a lower member disposed underneath the upper member; the wings of the connecting bracket are formed perpendicular to the top of the upper member;

the legs comprising
   a stationary central leg having a proximal end, a distal end and two opposite sides, and the proximal end of the stationary central leg secured between the upper and the lower members of the body; and
   two adjustable side legs, each having a proximal end, a distal end and a top, and the proximal end of each adjustable side leg respectively and pivotally mounted at a pivoting point disposed each opposite side of the stationary central leg between the upper and the lower members of the body; and
   the pivot pin has an enlarged end and a threaded end passes through the pivot hole in the post and the aligned pivot holes in the wings, and a nut is screwed on the threaded end of the pivot pin, which extends out of the pivot hole in one of the wings to exactly position the post in the connecting bracket;

wherein the tripod further comprises
   an arm assembly respectively mounted on the top of each adjustable side leg, and the arm assembly comprising
     a bracket having an angled edge and pivotally mounted on the top of the adjustable side leg;
     a stop secured on the top of the adjustable side leg and abutting the angled edge of the bracket;
     a connecting rod with a proximal end and a distal end, and the proximal end pivotally mounted in the bracket; and
   a U-shaped rod having two ends and attached to the distal end of the connecting rod; and
   a bumper attached to the top end of the post;
   whereby when the ends of the U-shaped rods are unfolded to face upward, a musical instrument can be placed on the U-shaped rod between the ends and lean against the bumper on the post to display the musical instrument.

3. The tripod as claimed in claim 1, wherein the tripod further comprises
   an arm assembly respectively mounted on the top of each adjustable side leg, and the arm assembly comprising
     a bracket having an angled edge and pivotally mounted on the top of the adjustable side leg;
     a stop secured on the top of the adjustable side leg and abutting the angled edge of the bracket,
     a connecting rod with a proximal end and a distal end, and the proximal end pivotally mounted in the bracket; and
     a U-shaped rod having two ends and attached to the distal end of the connecting rod; and
   a bumper attached to the top end of the post;
   whereby when the ends of the U-shaped rods are unfolded to face upward, a musical instrument can be placed on the U-shaped rod between the ends and lean against the bumper on the post for display the musical instrument.

4. tripod comprising:

a body with a top;

a connecting bracket with two wings formed parallel to each other attached to the top of the body, and a pivot hole transversally defined in each wing;

a post pivotally mounted in the connecting bracket by means of a pivot pin and the post having
   a top end,
   a bottom end, and
   a pivot hole transversally defined in the post near the bottom end aligned with between the pivot holes in the two wings of the connecting bracket; and three legs horizontally mounted in and extending from the body;

wherein at least two of the legs are pivotally mounted in the body and have a capability of pivoting away from each other within a specific angular displacement, and the bottom end of the post is squeezed between the two wings of the connecting bracket to hold the post in place;

wherein the body comprises
   an upper member with the top; and
   a lower member disposed underneath the upper member; the wings of the connecting bracket are formed perpendicular to the top of the upper member;

the legs comprising
   a stationary central leg having a proximal end, a distal end and two opposite sides, and the proximal end of the stationary central leg secured between the upper and the lower members of the body; and
   two adjustable side legs, each having a proximal end, a distal end and a top, and the proximal end of each adjustable side leg respectively and pivotally mounted at a pivoting point disposed each opposite side of the stationary central leg between the upper and the lower members of the body; and the pivot pin has an enlarged end and a threaded end passes through the pivot hole in the post and the aligned pivot holes in the wings, and a nut is screwed on the threaded end of the pivot pin, which extends out of the pivot hole in one of the wings to exactly position the post in the connecting bracket;

wherein multiple positioning holes are defined through the top of the upper member of the body and are radially arranged around each pivoting point of the proximal end of each adjustable side leg; and a locking stub is retractably mounted in each adjustable side leg corresponding to the positioning holes in the upper member and adapted to selectively engage one of the positioning holes in the upper member.

5. The tripod as claimed in claim 4, wherein the tripod further comprises an arm assembly respectively mounted on the top of each adjustable side leg, and the arm assembly comprising a bracket having a angled edge and pivotally mounted on the top of the adjustable side leg;

a stop secured on the top of the adjustable side leg and abutting the angled edge of the bracket, a connecting rod with a proximal end and a distal end, and the proximal end pivotally mounted in the bracket; and a U-shaped rod having two ends and attached to the distal end of the connecting rod; and a bumper attached to the top end of the post;

whereby when the ends of the U-shaped rods are unfolded to face upward, a musical instrument can be placed on the U-shaped rod between the ends and lean against the bumper on the post for display the musical instrument.

6. The tripod as claimed in claim 1, wherein the locking stub retractably mounted in the post corresponding to the positioning holes in the wing is adapted to selectively engage one of the positioning holes in the opposite wing.

* * * * *

UNITED STATES PATENT AND TRADEMARK OFFICE
CERTIFICATE OF CORRECTION

PATENT NO. : 6,695,268 B1
DATED : February 24, 2004
INVENTOR(S) : Wu-Hong Hsieh

It is certified that error appears in the above-identified patent and that said Letters Patent is hereby corrected as shown below:

<u>Title page,</u>
Item [54], Title, delete the word "ADUSTABLE" and insert therefor the word
-- ADJUSTABLE --.

Signed and Sealed this

Twenty-second Day of June, 2004

JON W. DUDAS
*Acting Director of the United States Patent and Trademark Office*